United States Patent
Song et al.

(10) Patent No.: US 8,077,570 B2
(45) Date of Patent: Dec. 13, 2011

(54) ERROR RECOVERY METHOD FOR VIDEO RECORDING

(75) Inventors: Fong-Hwa Song, Taipei County (TW); Po-Wei Lin, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 468 days.

(21) Appl. No.: 11/965,596

(22) Filed: Dec. 27, 2007

(65) Prior Publication Data

US 2009/0067301 A1 Mar. 12, 2009

(30) Foreign Application Priority Data

Sep. 11, 2007 (TW) .............................. 96133822 A

(51) Int. Cl.
*G11B 7/00* (2006.01)
(52) U.S. Cl. .................... 369/53.15; 369/53.17; 386/263
(58) Field of Classification Search ............... 369/47.14, 369/44.32, 53.15, 53.17; 714/2, 20, 24, 42; 386/46, 125, 263, 264
See application file for complete search history.

(56) References Cited

U.S. PATENT DOCUMENTS

| | | | | |
|---|---|---|---|---|
| 6,189,118 | B1 * | 2/2001 | Sasaki et al. .................. | 714/710 |
| 6,584,276 | B2 * | 6/2003 | Ando et al. .................... | 386/248 |
| 7,134,039 | B2 * | 11/2006 | Wang ............................... | 714/2 |
| 2001/0043800 | A1 * | 11/2001 | Gotoh et al. .................. | 386/111 |
| 2005/0050402 | A1 * | 3/2005 | Koda et al. ...................... | 714/42 |
| 2005/0195721 | A1 * | 9/2005 | Seo et al. .................... | 369/59.25 |
| 2005/0232609 | A1 * | 10/2005 | Eckleder ....................... | 386/125 |
| 2006/0008250 | A1 * | 1/2006 | Wang ............................... | 386/95 |
| 2006/0087945 | A1 * | 4/2006 | Hwang et al. .............. | 369/53.17 |

* cited by examiner

*Primary Examiner* — Wayne Young
*Assistant Examiner* — Thomas Alunkal
(74) *Attorney, Agent, or Firm* — J.C. Patents

(57) ABSTRACT

An error recovery method for video recording is provided. The method is suitable for recovering data of a disk when an error occurs during video recording. The method includes following steps. First, a last writable address of the disk is obtained. Then, a file system last written onto the disk is located by searching forward from the last writable address. Next, a new file system is generated based on the file system and a data segment of the defected recording. Finally, the new file system is written onto the disk so as to recover the data on the disk. Therefore, the data currently written onto the disk and the existing data in the disk can be recovered.

8 Claims, 10 Drawing Sheets

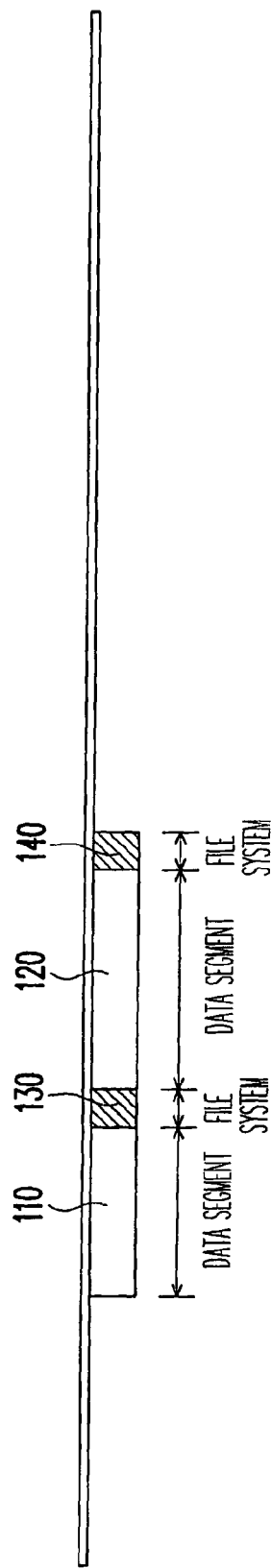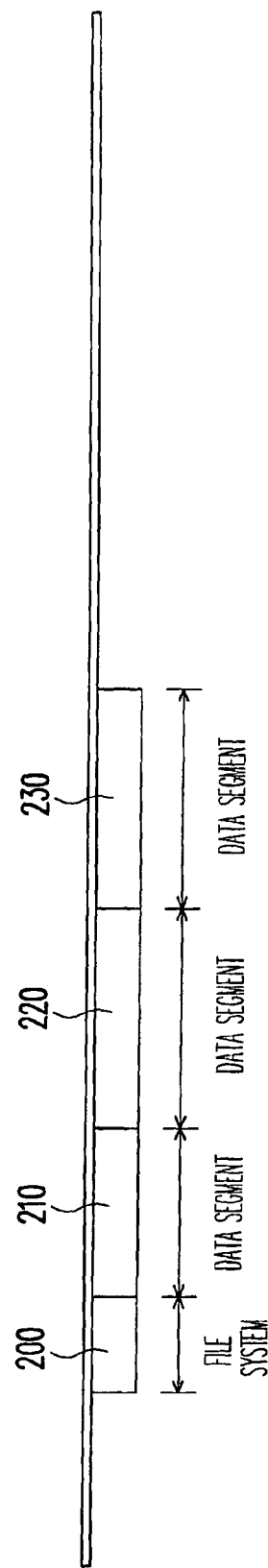

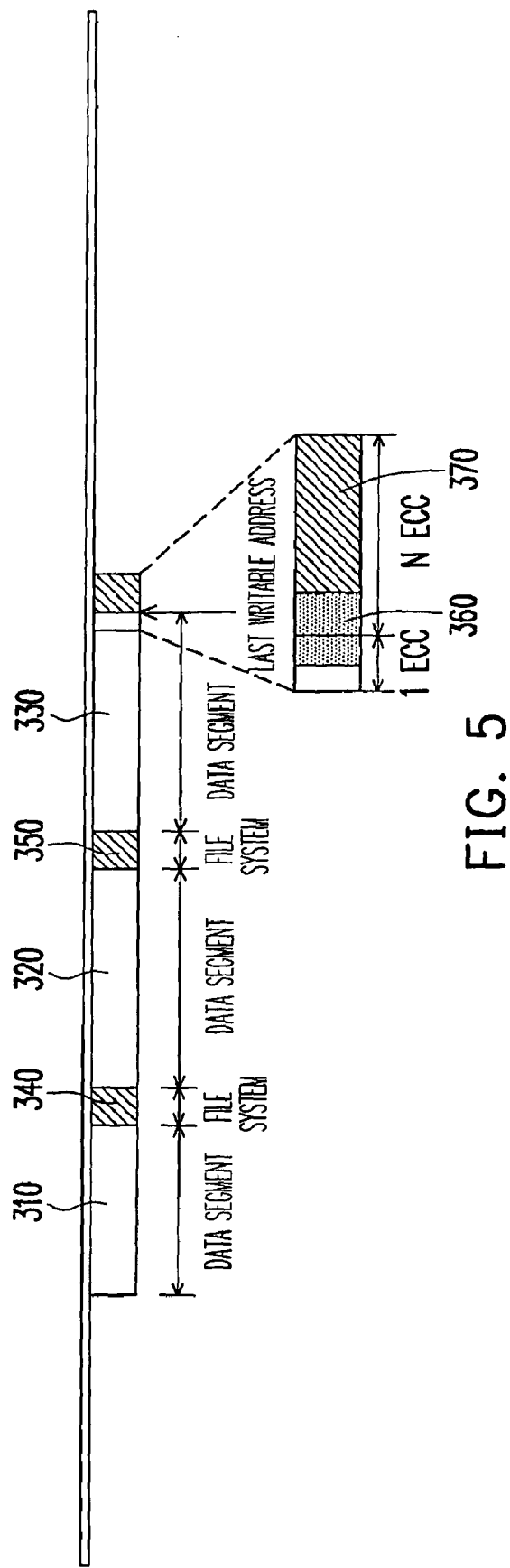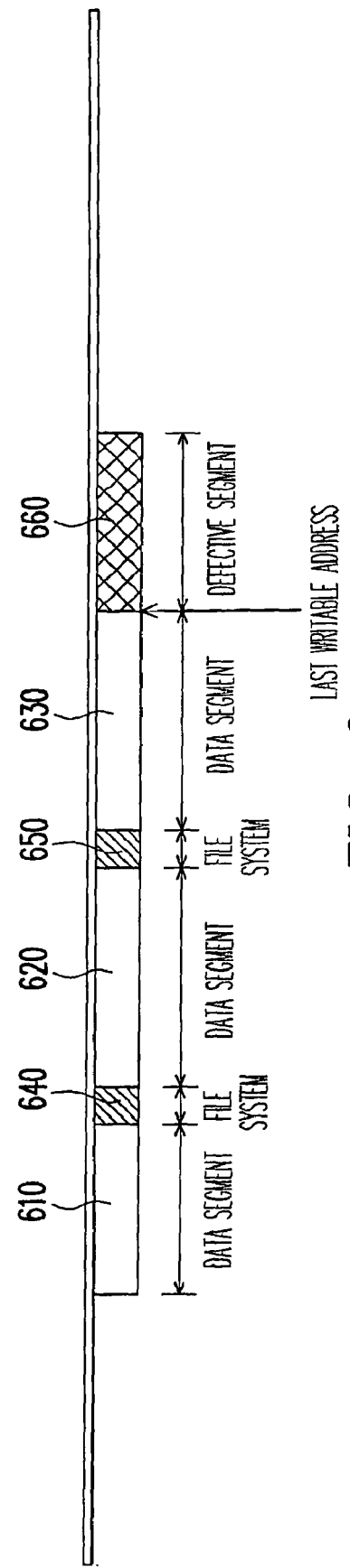

ERROR RECOVERY METHOD FOR VIDEO RECORDING

CROSS-REFERENCE TO RELATED APPLICATION

This application claims the priority benefit of Taiwan application serial no. 96133822, filed on Sep. 11, 2007. The entirety of the above-mentioned patent application is hereby incorporated by reference herein and made a part of this specification.

BACKGROUND OF THE INVENTION

1. Field of the Invention

The present invention generally relates to an error recovery method for a disk, in particular, to an error recovery method for video recording.

2. Description of Related Art

Along with the coming of the information era and the increasing quantity of digital data of various sources and formats, optical storage media with large storage capacity, fast access speed, high portability, and easy storage has become one of the most indispensable tools.

Digital versatile disk (DVD) is a new generation optical storage medium. Both data density and capacity of a DVD are much higher than those of a conventional compact disk (CD). The formats of DVDs can be categorized into DVD-ROM, DVD-R, DVD-RW, DVD-RAM, DVD+R, DVD+RW etc. according to the applications and manufacturers thereof. A user can record video data or information data into a DVD conveniently by using a DVD video recorder or DVD recording device installed in a computer system.

However, a video recording process may fail due to bad quality of the disk, defects on the disk caused by improper usage (for example, scratches and fingerprints etc), or unexpected power failure during the recording process. In this case, the video data that were recorded onto the disk before the problem occurs becomes inaccessible.

To be specific, the processing of a file system on a disk during realtime video recording is different from that in a data burning software. The initial address of the file system is fixed when disk is being initialized; during the recording process before disk is being finalized, the address for the updated file system should be determined by the address of the last video data which is written onto the disk. If additional video is to be recorded onto the disk, a data detection operation is performed beforehand in order to obtain the up-to-dated file system, and the video can then be recorded onto the disk or the disk can be finalized based on the information from the latest file system.

FIG. 1 is a diagram illustrating the data in a conventional write-once DVD. Referring to FIG. 1, during the video recording sessions with a write-once DVD, a file system (file system 130 or 140) will be established each time at the end of the record session. The updated file system will locate right after the end address of a data segment (data segment 110 or 120) which contains the updated and descriptive information of the data segments on the disk, so that later on the data segments can be read and played-back by a player.

FIG. 2 is a diagram illustrating the data allocation on a conventional rewritable DVD. Referring to FIG. 2, during the video recording sessions with the rewritable DVD, file system 200 will be saved on a fixed section on the disk. It would be updated each time after a data segment (data segment 210, 220, or 230) is being recorded, so that later on the data segment can be read and play-back by a player.

However, when video is being recorded onto a disk, the duration of the video recording is usually determined by the user. Accordingly, the length and number of video data segments recorded onto a disk can not be known before the recording session ends. Thereby, once an error occurs during a video recording session, the session will be interrupted abnormally and the file system on the disk will fail to be updated in time. As a result, the disk will not be able to be used for further recording and even the previous recorded video sessions will be lost.

SUMMARY OF THE INVENTION

Accordingly, the present invention is directed to an error recovery method for video recording, wherein the file system before the defected recording is located and updated based on the incomplete data segment of the defected video session. This up-to-date file system is used to recover the disk and the defected recording session.

The present invention is directed to an error recovery method for video recording, wherein a video indicator is inserted in front of each video data segment, and the video indicator is updated periodically during the video recording. By referring to this indicator, the length of the video data session can be retrieved during the video data recovery process.

The present invention provides an error recovery method for video recording. The method is suitable for recovering data on a disk when an error occurs during video recording. The method includes the following steps. First, the last writable address of the disk is obtained. Then, the file system version that is before the commencing of the defected recording is located by searching forward from the last writable address. Next, a new file system is generated based on the file system found and the incomplete video data segment of the defected recording on the disk. Finally, this new file system is written onto the disk in order to recover the data of the disk. According to this embodiment of the prevent invention, the disk is a write-once digital versatile disk (DVD).

According to an embodiment of the present invention, the error recovery method further includes determining whether the incomplete video data segment of the defected recording on the disk is to be reserved after the step of searching for the file system version that is before the commencing of the defected recording, wherein if the data segment is to be reserved, the data segment is recovered by generating a new file system based on the file system found and the data segment of the defected recording. This new file system is written onto the disk to complete the recovery of the video data.

According to an embodiment of the present invention, the error recovery method further includes the action of detecting the length of the defective segment on the disk which causes the write error. This action is taken after the step of obtaining the last writable address of the disk.

According to an embodiment of the present invention, the error recovery method further includes the action of determining whether the length of the defective segment exceeds a predetermined length. This action is taken after the step of searching forward for the file system version that is before the commencing of the defected recording, wherein when the length of the defective segment exceeds the predetermined length, the disk finalization procedure is directly performed as further recording may not be possible.

According to an embodiment of the present invention, whether the incomplete data segment of the defected recording is to be reserved is determined by comparing the length of the defective segment with the predetermined length, wherein if the data segment is to be reserved, the data segment is recovered by generating a new file system based on the file system found and the incomplete data segment This new file system is written onto the disk to complete the recovery procedure of the disk.

According to an embodiment of the present invention, the step of detecting the length of the defective segment which causes the error further includes accumulating the number of errors caused by the defective segment and determining whether the number exceeds a predetermined number, wherein if the number exceeds the predetermined number, the disk finalization procedure is directly performed to the disk.

According to an embodiment of the present invention, the error recovery method further includes directly writing the file system onto the disk and performing the disk finalization procedure to the disk after the step of searching forward for the file system version that is before the commencing of the defected recording.

According to an embodiment of the present invention, the step of generating the new file system based on the file system found and incomplete data segment of the defected recording further includes the generation of a updated navigation data which contains the recovered data segment. This new navigation data is to be included in the new file system.

According to an embodiment of the present invention, the error recovery method further includes inserting a buffered data segment after the data segment before the step of writing the new file system onto the disk, wherein the buffered data segment is composed of one or more error checking and correcting (ECC) data.

According to an embodiment of the present invention, the error recovery method further includes performing the disk finalization procedure after the step of writing the new file system into the disk.

The present invention further provides an error recovery method for video recording. The method is suitable for recovering a data of a disk when an error occurs during video recording. The method includes following steps. First, the file system of the disk is obtained in order to obtain the last writable address of a data segment before the commencing of the defected recording. Then, a video indicator of the incomplete data segment is located by searching backward from the address obtained from the last file system in order to retrieve a recording time and length of the defected recording. Finally, the file system of the disk is updated according to the recording time and length in order to recover the data on the disk. The disk is a rewritable DVD.

According to an embodiment of the present invention, the error recovery method further includes determining whether the incomplete data segment of the defected recording is to be reserved after the step of searching backward for the video indicator of the defected data segment obtaining the recording time and length of the defected recording, wherein if the data segment is to be reserved, the data segment is recovered by generating a new file system based on the above mentioned file system and the recovered data segment. This new file system is written into the disk in order to recover the data of the disk.

According to an embodiment of the present invention, the step of generating the new file system based on the file system and the recovered data segment further includes detecting the length of a defective segment on the disk which causes the write error. The generating of the new file system is based on the above mentioned file system, the data segment being recovered and the length of the defective segment. This new file system is then written onto the disk in order to recover the data of the disk.

According to an embodiment of the present invention, the error recovery method further includes detecting the length of the defective segment which causes the write error on the disk. This action takes place after the step of obtaining the length of the defected recording. The error recovery method further includes recording more video sessions with new video data segment being recorded after the defective segment. The new video session can be recorded after the step of disk recovery.

According to an embodiment of the present invention, the error recovery method further includes directly writing the file system onto the disk and removing the video indicator of the data segment after the step of obtaining the address of the data segment last written onto the disk before the commencing of the defected recording.

According to an embodiment of the present invention, the step of writing the recording time into the file system of the disk in order to recover the data of the disk further includes the generation of an updated navigation data which contains the data segment recovered. This navigation data is included in the new file system. According to this embodiment of the present invention, the disk is a rewritable DVD.

In the present invention, the incomplete data segment of a defected recording is located by searching for a file system on the disk and a video indicator of a data segment. The file system on the disk is then updated based on the recovered data and the previous file system version. Moreover, in the present invention, the length of a defective segment which causes the write error is detected and the number of occurrences of such defects is recorded, so that it is accordingly determined that whether the disk could be further recorded or directly finalized. Thereby, in the present invention, not only the data segment previously recorded can be saved, but data can be continuously written onto the disk from where the error occurs or the address after the defective segment. Accordingly, the consumption of disks can be reduced through the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a diagram illustrating the data allocation on a conventional write-once DVD.

FIG. 2 is a diagram illustrating the data allocation on a conventional rewritable DVD.

FIG. 5 is a diagram illustrating the data allocation on the disk after the data is recovered according to the first embodiment of the present invention.

FIG. 6 is a diagram illustrating the data allocation on a disk when a disk defect is encountered according to a second embodiment of the present invention.

DESCRIPTION OF THE EMBODIMENTS

Figure 3:
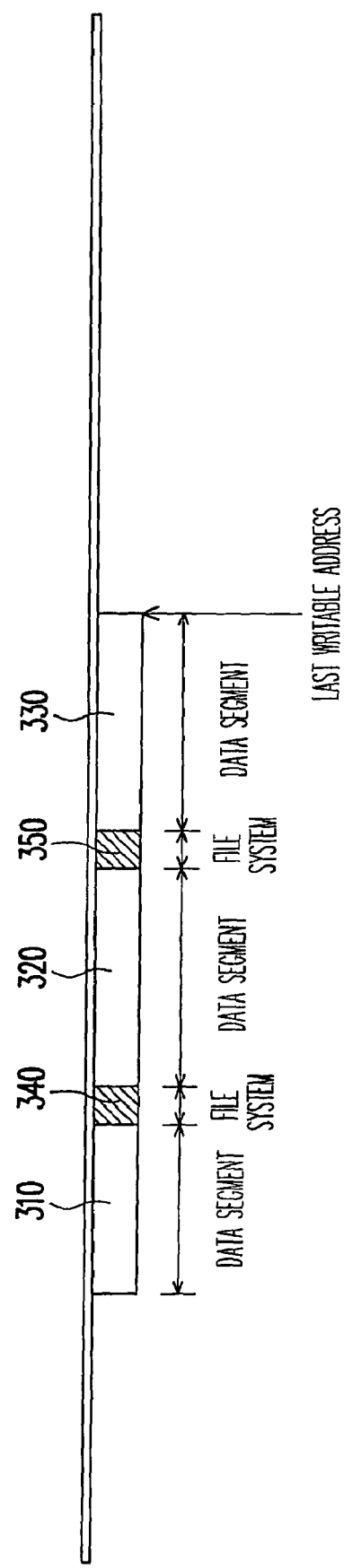
FIG. 3 is a diagram illustrating the data allocation on a disk when a power failure occurs according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The data recorded onto a disk includes video data and file system. The method for recording and allocating the file system on the disk may varies along with different type of disk, but the key is that a file system is being updated based on the content of the present video recording after a user presses the "stop" button to end the video recording process. However, if a power failure occurs or a write error caused by a defect on the disk happens during the video recording process, the video recording process may be terminated abnormally. As the result, the file system on the disk cannot be updated in time. In this case, the last updated file system version before the commencing of the defected recording needs to be located in order to find out the allocation information of the data segments which were recorded on the disk previously for the data recovery purpose. On the other hand, if the error is caused by a defect on the disk, the length of a defective segment needs to be detected so that the defective segment can be skipped during a next video recording process and the disk then could be used for further video recording sessions. As described above, the present invention provides an error recovery method for video recording. Below, embodiments of the present invention will be described in detail with reference to accompanying drawings.

The present invention provides different solution based on the type of the disk and the cause of the error in order to recover the data segment of the defected recording and the data segment previously recorded, so that the disk could be used for further video recording sessions. Embodiments of the present invention corresponding to different situations will be respectively described below.

First Embodiment

FIG. 3 is a diagram illustrating the data allocation on a disk when a power failure occurs according to a first embodiment of the present invention. Referring to FIG. 3, in the present embodiment, the disk is a write-once DVD, and the data recorded on the disk includes data segments 310, 320, and 330 and file systems 340 and 350 when a power failure occurs during a video recording process. As shown in FIG. 3, each time after a complete data segment has been recorded into the disk, a file system is recorded after the data segment in the disk containing the related information of the data segments. However, if a power failure occurs during the video recording process, not only the recording of the data segment 330 which is being currently recorded cannot be completed, but the file system containing the data segment 330 cannot be generated. Thus, when the disk is played, the data cannot be read correctly due to the failure in allocating a file system.

Figure 4:
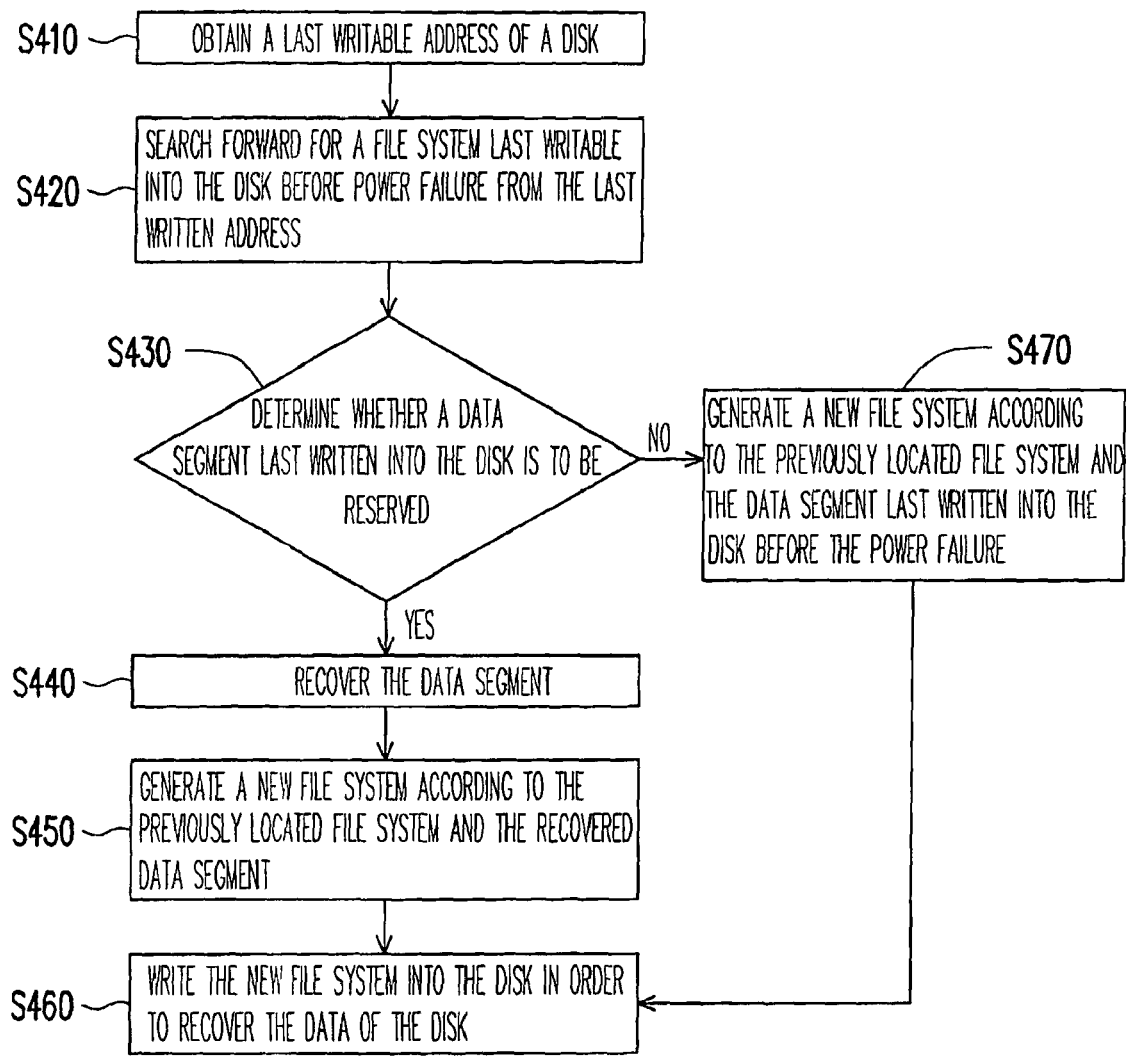
FIG. 4 is a flowchart of an error recovery method for video recording according to the first embodiment of the present invention.

FIG. 4 is a flowchart of an error recovery method for video recording according to the first embodiment of the present invention. Referring to both FIG. 3 and FIG. 4, in the present embodiment, when a power failure occurs during the video recording process, first, a last writable address of the disk is obtained from the record of the disk recorder (step S410), and a file system last written into the disk is located by searching forward from the last writable address (step S420). As shown in FIG. 3, the last writable address is the end of the data segment 330, and the file system 350 which is last written into the disk can be located by searching forward from the last writable address.

Next, whether a data segment of the defected recording should be reserved is determined (step S430). If the data segment should be reserved, the data segment is recovered (step S440), and a new file system is generated based on the previously located file system and the recovered data segment (step S450). Finally, the new file system is written onto the disk in order to recover the data of the disk (step S460).

On the other hand, if it is determined that the data segment is not to be reserved in step S430, the new file system is directly generated based on the previously located file system and the data segment last recorded into the disk before the power failure (step S470). Finally, the new file system is written onto the disk in order to recover the data of the disk (step S460). It should be noted that it is not sure whether the last data being written onto the disk, when the power failure occurs, is a completed error checking and correcting (ECC) data, according to an embodiment of the present invention, a buffered data segment is further inserted after the data segment in step S460.

FIG. 5 is a diagram illustrating the data allocation on the disk after the data is recovered according to the first embodiment of the present invention. Referring to FIG. 5, the end portion of the data segment 330 is not a complete ECC data due to power failure, a plurality of ECC data can be appended in back of the data segment 330 as a buffered data segment 360. This is to reserve a blank segment as a buffer, so that the response of an optical device in the disk recorder can catch up with the data recording time. The data correctness and safety can be ensured accordingly.

Referring to FIG. 5 again, the new file system 370 is written right after the buffered data segment 360 as a data segment comprising N ECC data units, so as to complete the updating of the file system. The corresponding data segments can be located and read by reading the data in the new file system 370 when next time the disk is being played.

It should be mentioned that in the foregoing steps S450 and S470, a navigation data including the new data segment is further re-generated and inserted into the new file system, in addition to generating the new file system based on the data segment and the file system, so that the recovered video session can be navigated and played back by the player.

Second Embodiment

FIG. 6 is a diagram illustrating the data allocation on a disk when a disk defect is encountered according to a second embodiment of the present invention. Referring to FIG. 6, in the present embodiment, the disk is a write-once DVD and an abnormal record termination is caused by a defect on the disk during a video recording process. The data recorded on the disk includes data segments 610, 620, and 630 and file systems 640 and 650. Same as in the first embodiment, each time after a data segment has been recorded onto the disk, a file system is recorded after the data segment for recording the related information of the data segment. However, unlike in the first embodiment, the currently recorded data segment 630 is followed by a defective segment 660 when a write error is caused by this defective segment on the disk during the video recording process. Similarly, since the file system cannot be updated in time, data recorded on the disk cannot be read or played-back correctly by the player.

Figure 7:
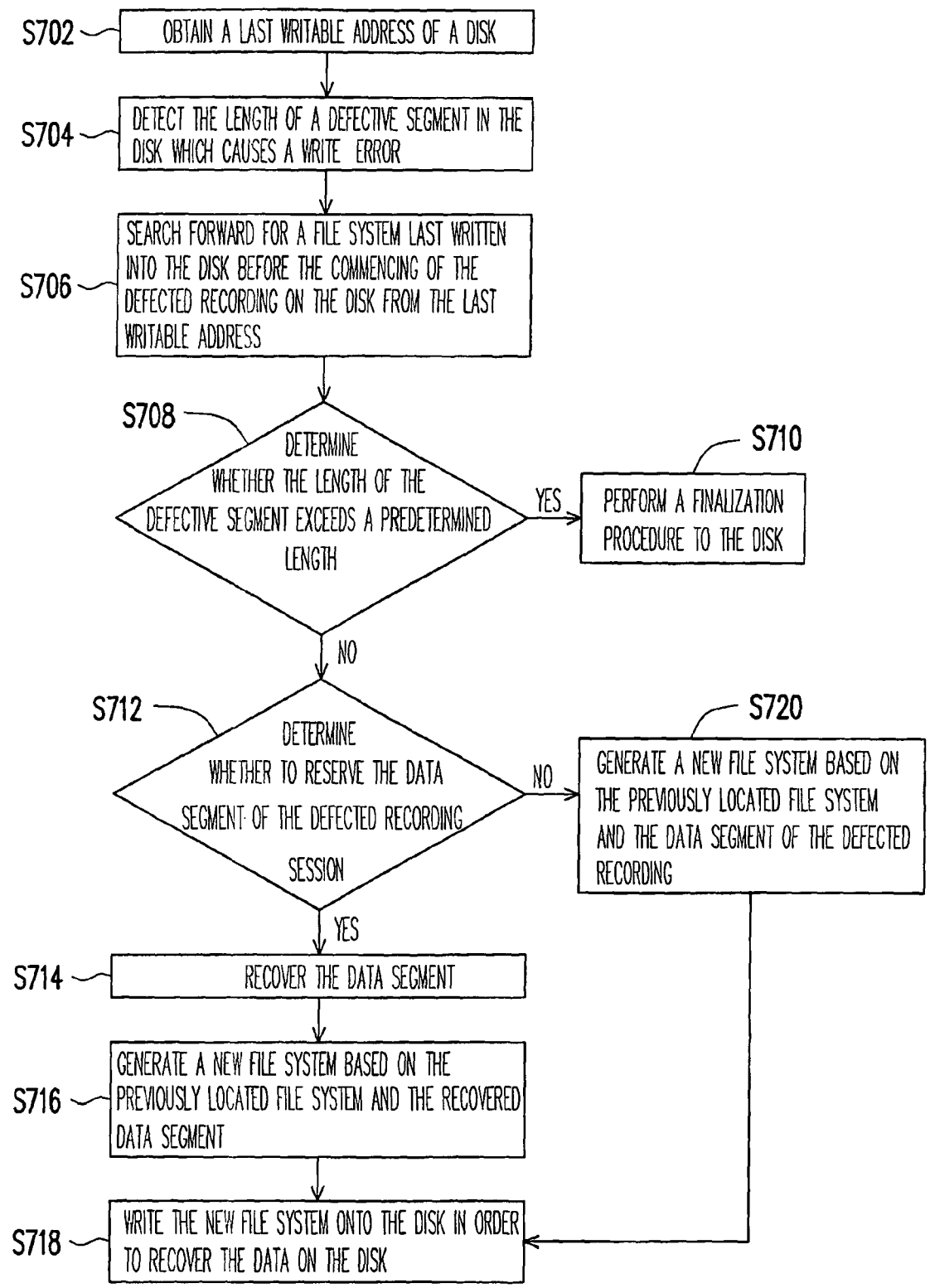
FIG. 7 is a flowchart of an error recovery method for video recording according to the second embodiment of the present invention.

FIG. 7 is a flowchart of an error recovery method for video recording according to the second embodiment of the present invention. Referring to both FIG. 6 and FIG. 7, in the present embodiment, when an error is caused by a defect on the disk, first, a last writable address of the disk is obtained from the record of the disk recorder (step S702), and the length of the defective segment which causes the write error is detected (step S704). The length of the defective segment is obtained by searching backward from the last writable address. The system can determine the degree of the defect on the disk based on the detected length of the defective segment in order to determine whether to perform a direct finalization procedure to the disk.

Additionally, in the present embodiment, the file system before the commencing of the defected recording on the disk is also located by searching forward from the last writable address (step S706). The detected length of the defective segment is compared at this step with a predetermined length (step S708), so as to determine whether to perform a direct finalization procedure to the disk. If the length of the defective segment exceeds the predetermined length, it is determined that the disk is badly damaged and not suitable for further recording, therefore a finalization procedure is performed directly to the disk (step S710).

Figure 8:
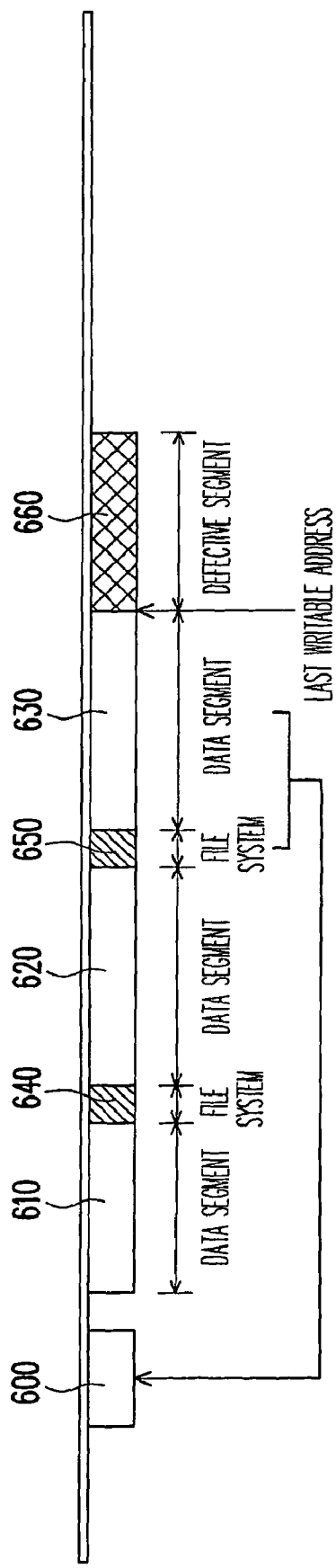
FIG. 8 is a diagram illustrating the data allocation on the disk after the data is recovered according to the second embodiment of the present invention.

FIG. 8 is a diagram illustrating the data in the disk after the data is being recovered according to the second embodiment of the present invention. Referring to FIG. 8, since the length of the defective segment 660 exceeds the predetermined length, a disk finalization data is directly recorded on a specific section 600 of the disk so as to complete the recording of the disk.

Contrarily, if the length of the defective segment does not exceed the predetermined length, it is determined that the disk is only slightly defected and can be used further for video data recording. it is determined whether the data segment of the defected recording session is to be reserved (step S712). The data segment is recovered if the data segment is to be reserved (step S714), and a new file system is generated based on the previously located file system and the recovered data segment (step S716). Finally, the new file system generated is written onto the disk in order to recover the data on the disk (step S718).

On the other hand, if it is determined not to reserve the data segment in step S712, the new file system can be directly generated based on the previously located file system and the data segment of the defected recording (step S720). Finally, the new file system is written onto the disk in order to recover the data on the disk (step S718). The new file system is written onto the disk located right after the defective segment. Here, the update of the file system on the disk is completed. The corresponding data segments can be located and read by reading the content in the new file system when next time the disk is being played.

Figure 9:
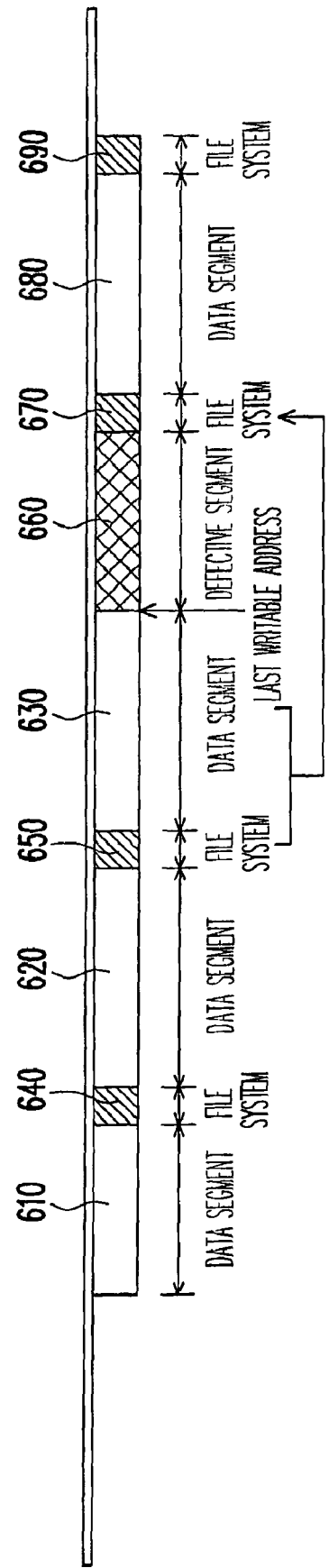
FIG. 9 is a diagram illustrating the data allocation on the disk after the data is recovered according to the second embodiment of the present invention.

FIG. 9 is a diagram illustrating the data allocation on the disk after the data is being recovered according to the second embodiment of the present invention. Referring to FIG. 9, if the length of the defective segment 660 does not exceed the predetermined length, a new file system 670 is generated based on the previously located file system 650 and a data segment of the defected recording 630. The updated file system is written onto the disk at the location in back of the defective segment 660. Besides, after the error caused by the defective segment 660 is recovered, the disk can be used for further recording, as the illustration shown a new data segment 680 with a newly generated file system 690 is appended at the end. Accordingly, through the error recovery method provided by the present invention, the disk can be further used for recording video data so that the consumption of disks can be reduced.

It should be mentioned that even though the disk can be further used for recording data when there is only a small defective area on the disk, if errors caused by such small defects keep occurring (for example, another defective segment appears after the data segment 680), the disk should be determined to have bad quality or to be seriously damaged. Therefore, in another embodiment of the present invention, the amount of errors caused by defects on the disk is further accumulated, and when the amount exceeds a predetermined amount, a finalization procedure is directly performed to the disk so that data cannot be recorded into the disk any more and the recording quality of the disk can be ensured.

The present invention also provides a solution for recovering data of a rewritable DVD when a power failure occurs or when an error is caused by a defect on the rewritable DVD during video recording, which will be described hereinafter with reference to an embodiment of the present invention.

Third Embodiment

According to the characteristics of a rewritable DVD, a file system is always recorded on a specific section of the disk. Once a power failure occurs or an error is caused by a defect on the disk during a video recording process, the length of the data segment of the defected record is unknown. We could not tell whether the data is a previously recorded content or data left by the power failure or the error by referring to the file system because the file system was not updated in time.

Figure 10:
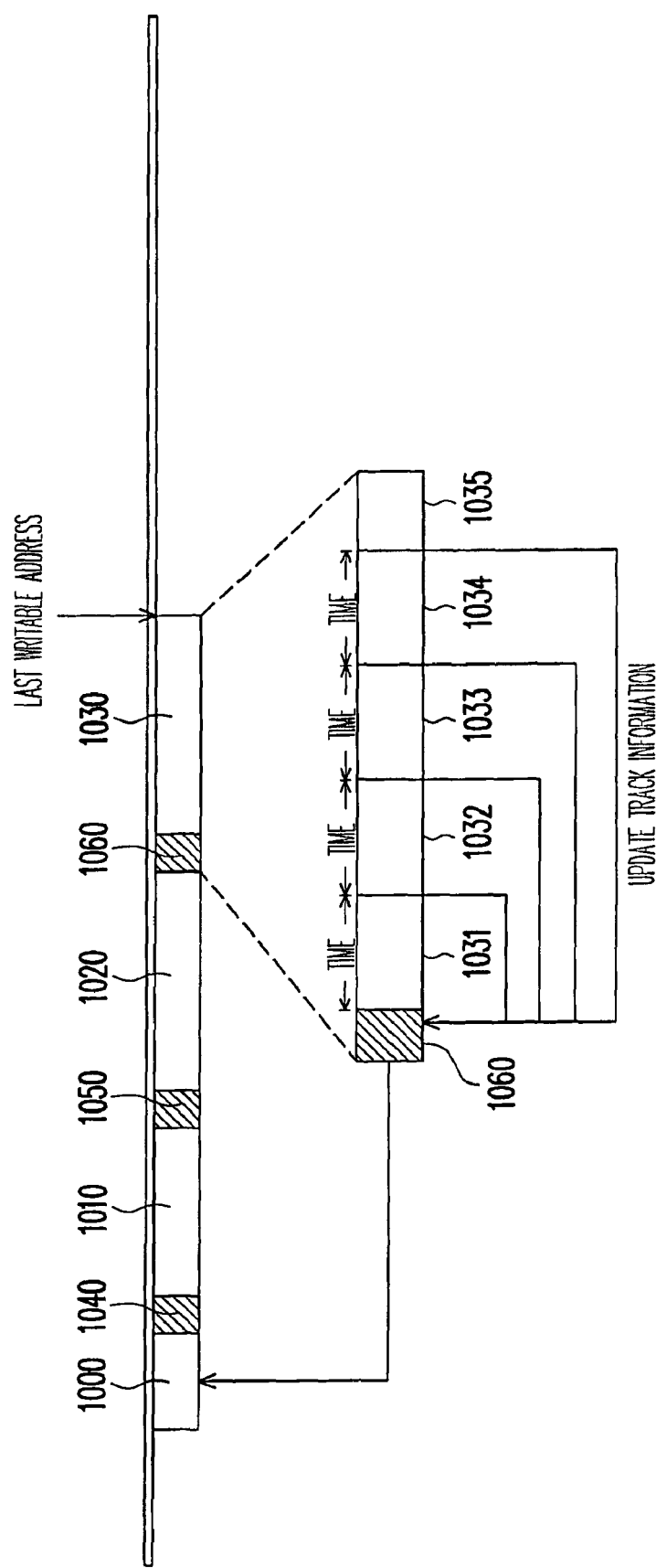
FIG. 10 is a diagram illustrating the data allocation on a disk when a power failure occurs according to a third embodiment of the present invention.

Accordingly, a concept of video indicator is adopted by the present embodiment. Based on the characteristic of rewritability of the rewritable DVD, a space of 1~n ECC is reserved every time when a data segment is being recorded in order to place a video indicator on the disk. The video indicator contains track information which includes video attributes, audio attributes, program (chapter) interface, cell information, VOBU maps, recording data and recording time. In the present embodiment, the track information in the video indicator is updated at intervals of a constant time. Accordingly, when a power failure occurs or when an error is caused by a defect on the disk during video recording, the data of the disk can be recovered by finding out a last location of the data segment on the disk according to the video indicator and updates these information into the file system on the disk. FIG. 10 is a diagram illustrating the data allocation on a disk when a power failure occurs according to the third embodiment of the present invention. Referring to FIG. 10, if a power failure occurs during the video recording process, the data recorded in the disk includes data segments 1010, 1020, and 1030, and video indicators 1040, 1050, and 1060 are respectively placed before each data segment. Regarding the data segment 1030, the track information recorded in the video indicator 1060 is updated at intervals of a constant time. In addition, the recorder updates the data in the video indicator to the file system 1000 after each video recording session ends so that later on a player can read data correctly from the disk.

However, when a power failure occurs, the data segment 1030 is not completed, wherein since the recording time of the last segment 1035 has not reached the constant time, only the track information of the segment 1034 is recorded in the video indicator 1060 and the file system 1000 is not updated yet. Thus, during playback of the disk, the player cannot get to know the attributes of the last data segment which has been correctly recorded into the disk based on the information in the file system and therefore the whole defected data segment cannot be navigated by the player.

Figure 11:
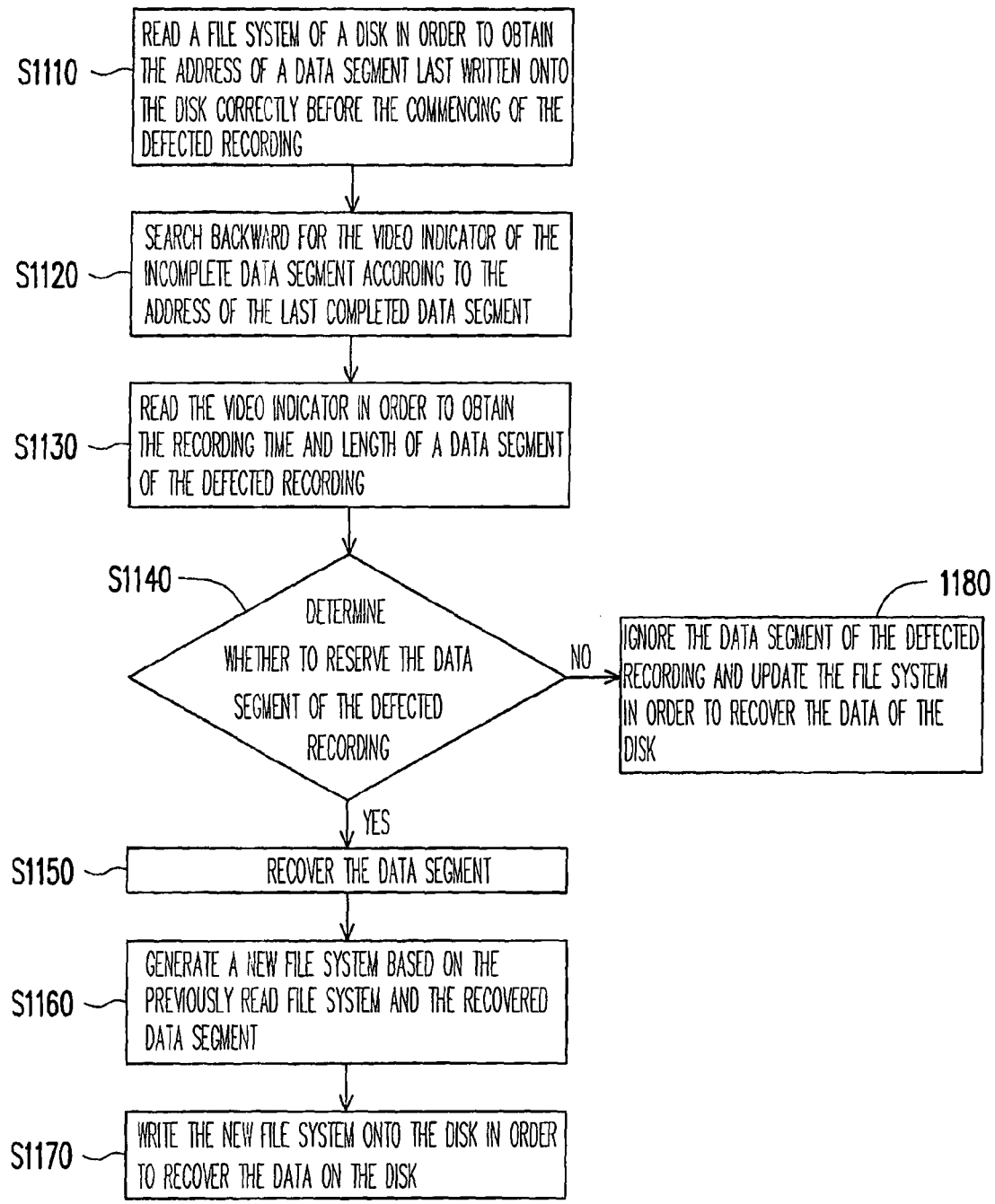
FIG. 11 is a flowchart of an error recovery method for video recording according to the third embodiment of the present invention.

The present invention provides a corresponding solution to resolve foregoing problem. FIG. 11 is a flowchart of an error recovery method for video recording according to the third embodiment of the present invention. Referring to both FIG. 10 and FIG. 11, in the present embodiment, when a power failure occurs during a video recording process, the file system of the disk is first read in order to obtain the address of a last data segment which is correctly written onto the disk before the commencing of the defected recording (step S1110).

Next, the video indicator of the incomplete data segment is located by searching backward according to the address of the last completed data segment (step S1120). As shown in FIG. 10, the last completed recorded data segment is data segment 1020, and the video indicator 1060 of the next data segment 1030 can be located by searching backward from the end of the data segment 1020.

Thereafter, the recording time and length of the data segment of the defected recording is obtained by reading the video indicator (step S1130). Since video indicator only updates in intervals, the recording times of subsequent segments after segment 1034 are unknown, therefore the subsequent segments are discarded. However, data loss is reduced through the error recovery method in the present embodiment since most segments (segments 1031~1034) can be recovered.

Next, it is determined whether the data segment of the defected recording is to be reserved or not (step S1140). If so, the data segment is recovered (step S1150), and a new file system is generated based on the previously located file system and the recovered data segment (step S1160). Finally, the new file system is written onto the disk in order to recover the data of the disk (step S1170).

On the other hand, if it is determined that the data segment should not to be reserved in step S1140, the data segment of the defected recording is ignored, and the file system is updated in order to recover the data of the disk (step S1180).

It should be mentioned that as described in the first embodiment, in order to allow the player to locate each chapter in the data segment 1030, the navigation data of the data segment 1030 may be re-generated and added into the file system 1000 besides writing the recording time into the file system of the disk. Accordingly, when the disk is played-back by a player, the content in the disk may be quickly browsed by reading the navigation data.

Moreover, if it is determined that the data segment is to be reserved, the information in the video indicator of the data segment of the defected recording can be directly updated into the file system after the address of the data segment is obtained. Meanwhile, the video indicator is removed so that a recorder can write data onto the disk directly from the end of the last data segment when next time the recorder tries to start a new recording session.

As described above, the error recovery method in the present embodiment not only recovers the previously recorded data but saves most data of a defected recording, so that the safety of data recording is improved. An error recovering method corresponding to another situation, wherein an error is caused by bad disk quality during video recording, will be described below with reference to an embodiment of the present invention.

Fourth Embodiment

Figure 12:
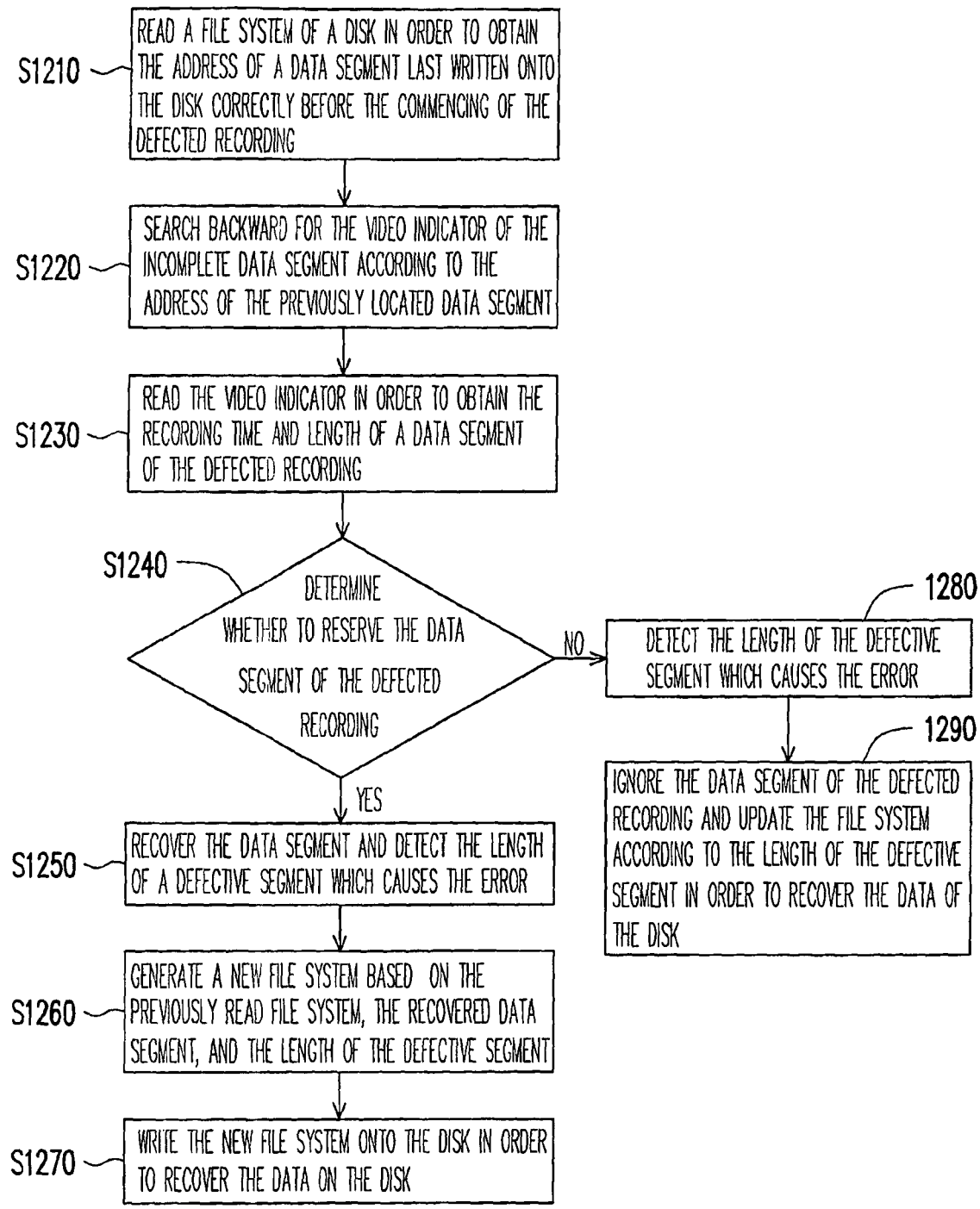
FIG. 12 is a flowchart of an error recovery method for video recording according to a fourth embodiment of the present invention.

FIG. 12 is a flowchart of an error recovery method for video recording according to a fourth embodiment of the present invention. Referring to FIG. 12, in the present embodiment, when an error is caused by a defect on a disk during video recording, a file system of the disk is first read to obtain the address of a data segment last written correctly into the disk before the commencing of the defected recording (step S1210). Then a video indicator of the incomplete data segment is located by searching backward according to the address of the previously located data segment (step S1220). Next, the recording time and length of a data segment of the defected recording is obtained by reading the video indicator (step S1230). Foregoing steps are the same as or similar to the steps S1110~S1130 in the third embodiment therefore will not be described in detail herein.

Next, it is determined whether the data segment of the defected recording is to be reserved or not (step S1240). If so, the data segment is recovered, and the length of a defective segment which causes the error is further detected (step S1250). After that, a new file system is generated based on the previously located file system, the recovered data segment, and the length of the defective segment (step S1260). Finally, the new file system is written onto the disk in order to recover the data of the disk (step S1270). Thus, when next time a recorder starts a new recording session, it writes another data segment starting from the end of the defective segment.

On the other hand, if it is determined that the data segment is not to be reserved in step S1240, the length of the defective segment which causes the error is further detected (step S1280). Finally, the data segment of the defected recording is ignored, and the file system is updated according to the length of the defective segment in order to recover the data of the disk (step S1290).

Figure 13:
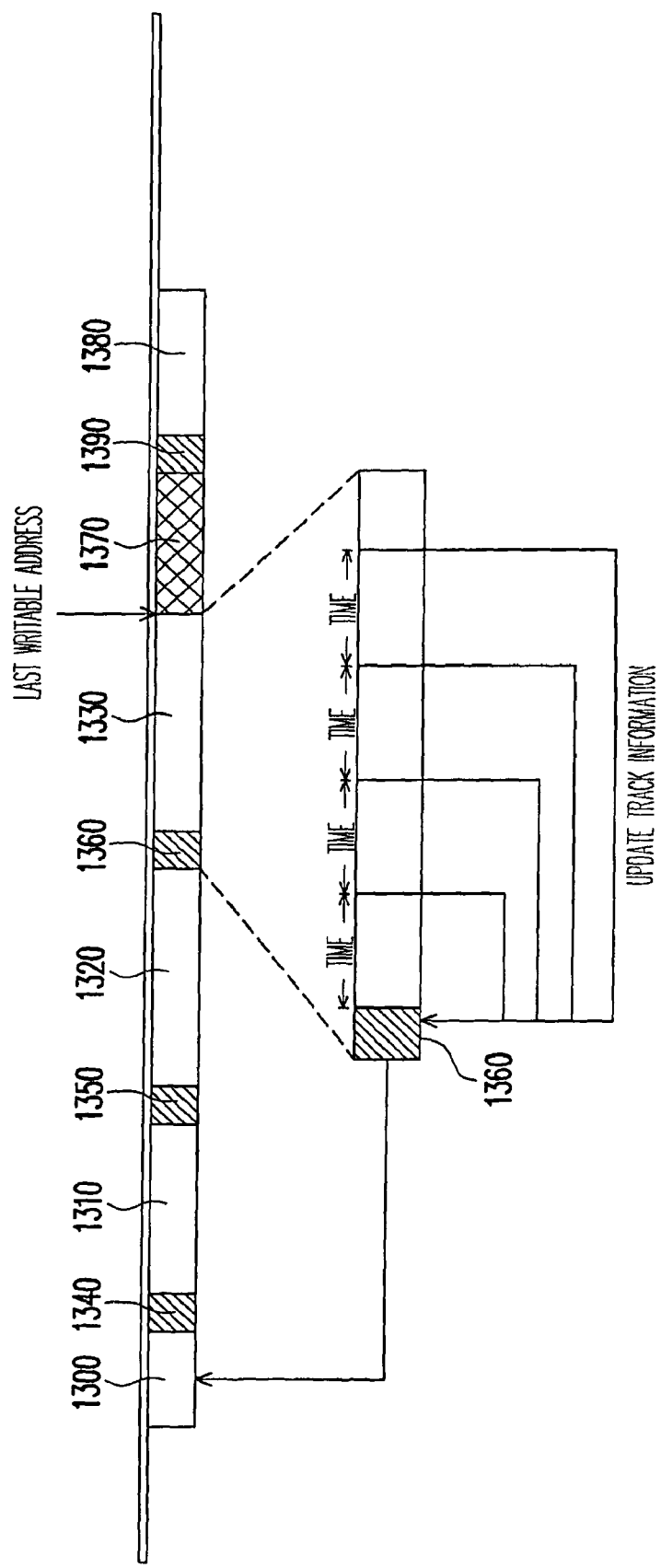
FIG. 13 is a diagram illustrating the data allocation on a disk after the data is recovered according to the fourth embodiment of the present invention.

FIG. 13 is a diagram illustrating the data allocation on a disk after the data is recovered according to the fourth embodiment of the present invention. Referring to FIG. 13, when an error is caused by a defect in the disk during video recording, the data recorded in the disk includes data segments 1310, 1320, and 1330, and video indicators 1340, 135, and 1360 are respectively placed before each data segment. Regarding the data segment 1330, the track information recorded in the video indicator 1360 is updated at intervals of a constant time.

When the error occurs, the length of a defective segment 1370 in the disk is detected, and the file system 1300 is updated based on the data in the video indicator 1360, so that a disk player can read data correctly from the disk. When next time the disk is used for recording data, another data segment 1380 is recorded onto the disk from the end of the defective segment 1370, and a corresponding video indicator 1390 is generated.

In summary, the error recovery method for video recording provided by the present invention has at least following advantages:

1. When an error is caused by power failure or defect in a disk during video recording, data on the disk can be recovered by updating a file system on the disk, so that the data being currently written into the disk and the data already exists on the disk can be both recovered.

2. The length of a defective segment on the disk can be automatically detected, so that the defective segment can be skipped when next time data is recorded onto the disk. Accordingly, consumption of disks can be reduced.

3. By placing a video indicator before each data segment on a rewritable DVD and updating the information in the video indicator at intervals, the data segment of the defected recording can be indicated and accordingly the data on the disk can be recovered.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An error recovery method for video recording comprising:
 obtaining a last writable address of a disk when commencing a defected recording, wherein the disk is a write-once digital versatile disk;
 searching forward for a file system last written onto the disk from the last writable address;
 generating a new file system according to the file system and a data segment last written before the commencing of the defected recording;
 inserting another data segment as a buffer after the data segment;
 writing the new file system spatially positioned after the buffer of the recorded data segment last written so as to recover the data on the disk;
 detecting the length of a defective segment on the disk after obtaining the last writable address of the disk;
 determining whether the length of the defective segment on the disk exceeds a predetermined length or not after searching forward for the file system last written onto the disk; and
 directly performing a finalization procedure to the disk when the length of the defective segment exceeds the predetermined length.

2. The method according to claim 1, wherein after searching forward for the file system last written onto the disk, the method comprises:
 determining whether the data segment last written onto the disk before the commencing of the defected recording is to be reserved or not; and
 recovering the data segment if the data segment is to be reserved.

3. The method according to claim 1, further comprising:
 determining whether the data segment last written onto the disk before the defected recording is to be reserved when the length of the defective segment does not exceed the predetermined length;
 recovering the data segment if the data segment is to be reserved;
 generating the new file system according to the file system and the recovered data segment; and
 writing the new file system onto the disk so as to recover the data on the disk.

4. The method according to claim 1, wherein the step of detecting the length of the defective segment which causes the error comprises:
 calculating a number of the errors caused by the defective segments;
 determining whether the number exceeds a predetermined number; and
 directly performing a finalization procedure to the disk when the number exceeds the predetermined number.

5. The method according to claim 1, wherein after searching forward for the file system last written onto the disk, the method further comprises:
 directly writing the file system onto the disk; and
 performing a finalization procedure to the disk.

6. The method according to claim 1, wherein the step of generating the new file system according to the file system and the data segment before the commencing of the defected recording last written onto the disk comprises:
 re-generating a navigation data of the data segment; and
 writing the navigation data into the new file system.

7. The method according to claim 1, wherein the buffer comprises a plurality of error checking and correcting (ECC) data.

8. The method according to claim 1, wherein after writing the new file system onto the disk so as to recover the data on the disk, the method further comprises:
 performing a finalization procedure to the disk.

* * * * *